United States Patent
Kotowski

[11] Patent Number: 5,852,961
[45] Date of Patent: Dec. 29, 1998

[54] TOOL FOR REMOVING OIL AND HAZARDOUS FLUID

[76] Inventor: Jeff Kotowski, 15461 Shannon Way, Nevada City, Calif. 95659

[21] Appl. No.: 861,129

[22] Filed: May 21, 1997

[51] Int. Cl.$^6$ .................................................. B25B 13/58
[52] U.S. Cl. ................................. 81/180.1; 81/184; 7/100
[58] Field of Search .................................. 81/180.1, 184, 81/121.1, 124.6; 7/100; D7/700; 222/460; 141/331, 332, 333

[56] References Cited

U.S. PATENT DOCUMENTS

| Re. 17,613 | 3/1930 | McGowan . | |
|---|---|---|---|
| 1,668,245 | 5/1928 | McGowan . | |
| 1,687,980 | 10/1928 | Higgins et al. . | |
| 3,967,697 | 7/1976 | Guenther . | |
| 4,145,939 | 3/1979 | Garrison | 81/125 |
| 4,149,575 | 4/1979 | Fisher . | |
| 4,230,002 | 10/1980 | Skidmore . | |
| 4,386,639 | 6/1983 | Gable et al. . | |
| 4,485,853 | 12/1984 | Gunderson . | |
| 4,714,138 | 12/1987 | Zaccone . | |
| 4,756,349 | 7/1988 | Atkins . | |
| 4,800,933 | 1/1989 | Moore et al. . | |
| 4,867,017 | 9/1989 | Holman | 7/100 |
| 4,951,721 | 8/1990 | Moore et al. . | |
| 5,199,331 | 4/1993 | Tsukamoto . | |
| 5,259,426 | 11/1993 | Burleigh et al. . | |
| 5,320,145 | 6/1994 | Avino . | |
| 5,386,748 | 2/1995 | Kilgore | 81/180.1 |
| 5,499,557 | 3/1996 | Fry . | |

*Primary Examiner*—David A. Scherbel
*Assistant Examiner*—Joni B. Danganan
*Attorney, Agent, or Firm*—David H. Jaffer

[57] ABSTRACT

A tool for use as an aid in emptying waste fluid from a reservoir to a waste container. This tool is a funnel shaped device having a large circular opening for entrance of waste fluid. A funnel wall extends from the larger opening to a smaller opening, preferably offset from the larger circular opening. Access to the funnel interior is provided through the funnel wall, serving as a guide and seal for passage of a wrench extension. The end of the extension is preferably a standard ⅜" square drive plug for mounting an appropriately sized ⅜" drive socket or plug for removal of the reservoir drain plug. The choice of socket or plug to be mounted to the extension depends on the configuration of the drain plug. The opposite end of the wrench extension has a socket for adapting to a preferred ⅜" driver. In operation, the wrench extension is passed through the access to the funnel interior, and the appropriate sized socket or plug is placed on the ⅜" drive end of the wrench extension. The funnel is then placed under a drain plug and engaged with the socket/plug. The drain plug is then removed by application of the ⅜" driver on the opposite end of the wrench extension. The waste fluid then empties into the funnel, which directs it into the waste container.

8 Claims, 14 Drawing Sheets

Cross Section B

Cross Section C

TOOL FOR REMOVING OIL AND HAZARDOUS FLUID

BACKGROUND OF THE INVENTION

1. Field of the Invention

The present invention relates generally to a device for the removal of hazardous fluid from a container of the type having a threaded drain plug, and more particularly to a device for directing the fluid to a collection reservoir, the device having a wrench extension sealably passing through a wall of the device for removal of the drain plug.

2. Brief Description of the Prior Art

In the process of removing fluid from a container, such as oil from an internal combustion engine, an operator's hands or gloves usually are contaminated by fluid spillage when removing the drain plug. Garage mechanics normally use a large basin, to catch the fluid, and simply rely on moving their hand away quickly when the fluid begins to pour out. The prior art includes a number of attempts to solve this problem.

A device is described in U.S. Pat. No. 4,230,002 by Skidmore, in the shape of a funnel having the small end attached to a drain hose, and a socket mount supported coaxially by a cross bar attached to and extended over the large funnel end. The small funnel opening has a hex drive, allowing an operator to rotate the funnel, with an open end box wrench for turning a socket applied to the socket mount for removal of a drain plug. The process is complicated by the fact that the funnel and tube need to be rotated, necessitating guiding the funnel with one hand, while the other performs the task of engaging and disengaging the open faced box wrench on the hex nut type of drive.

A similar device is disclosed in U.S. Pat. No. 4,800,933 by Moore, et al. It requires first loosening the drain plug, and then applying the funnel with the socket drive, a two-step process.

In U.S. Pat. No. 4,485,853 by Gunderson, a device is described in the form of a rigid rim, with a plastic sheet attached, forming a container. An operator can grab a drain plug by inserting the hand from the bottom of the rim, the plastic sheet providing a barrier between the hand and the drain plug and subsequent fluid. This, again, is a two-step process involving first loosening the drain plug, and then manually rotating the drain plug out by hand.

U.S. Pat. No. 4,714,138 by Zaccone is an attempt to provide a tool with a wrench extension fed through a collection housing. As designed, the extension socket occupies a large portion of the housing opening. Because of this, there is little space for draining fluid to go. A sealed joint to the fluid reservoir is provided, but since a level, clean surface is not always available, a sealed joint requirement is a problem area. Also, the wrench cannot be easily used with the collection housing in the vertical position, since the wrench extension is then in line with a tube (72). The tube (72) apparently provides guidance for a relatively short fluid exit conduit (70) and serves as a fluid drain. A disadvantage of this device is that it is complex in structure.

U.S. Pat. No. 4,756,349 by Atkins, and 4,386,639 by Gable, et al., both describe devices that require the normal drain plugs to be replaced with special valve apparatus that connects to a fluid collection container. These devices are relatively complex, and cannot be used to drain fluid from a container, until the container drain plug is replaced with the special valve apparatus. Such a device, for example, would not be useful in a service station environment where most vehicles would not be equipped with the valve.

Due to the limitations of the above-described devices, there is a need for an improved, simple and effective tool for the safe and sanitary removal of waste fluids.

SUMMARY OF THE INVENTION

It is therefore an object of the present invention to provide a convenient, inexpensive, rugged and useful tool for the removal of hazardous fluid from a container.

It is a further object of the present invention to provide a readily producible, easily operated hazardous fluid removal tool.

Another object of the present invention is to provide a tool which can be used with a conventional ratchet wrench for the purpose of quick removal of a drain plug while protecting the user from the rush of fluid upon removal of the plug.

Another object of the present invention is to provide a tool which can be used with an electric motor for the purpose of quick removal of a drain plug while protecting the user from the rush of fluid upon removal of the plug.

A further object of the present invention is to provide a tool for the removal of a drain plug and waste fluid that can be operated with one hand, while protecting the user from the rush of fluid upon removal of the plug.

Another object of the present invention is to provide a tool that can be used for the purpose of removal of a drain plug while protecting the user from the rush of fluid upon removal of the plug, where a funnel section of the tool does not rotate upon removal of the plug.

Another object of the present invention is to provide a tool which can be used for the purpose of removal of a drain plug while protecting the user from the rush of fluid upon removal of the plug, where the drain plug lies on an edge of the fluid container.

A still further object of the present invention is to provide a tool which can be used for the purpose of removal of a drain plug while protecting the user from the rush of fluid upon removal of the plug, where the drain plug lies on the bottom of the fluid container.

Still another object of the present invention is to provide a tool which can be used for removal of a drain plug, while protecting the user from the rush of fluid upon removal of the plug, while retaining the drain plug in a socket.

Briefly, a preferred embodiment of the present invention includes a tool for use as an aid in emptying waste fluid from a reservoir to a waste container. This tool is a funnel shaped device having a large circular opening for entrance of waste fluid. A funnel wall extends from the larger opening to a smaller opening, preferably offset from the larger circular opening. Access to the funnel interior is provided through the funnel wall, serving as a guide and seal for passage of a wrench extension. The end of the extension is preferably a standard ⅜" square drive plug for mounting an appropriately sized ⅜" drive socket or plug for removal of the reservoir drain plug. The choice of socket or plug to be mounted to the extension depends on the configuration of the drain plug. The opposite end of the wrench extension has a socket for adapting to a preferred ⅜" driver. In operation, the wrench extension is passed through the access to the funnel interior, and the appropriate sized socket or plug is placed on the ⅜" drive end of the wrench extension. The funnel is then placed under a drain plug and engaged with the socket/plug. The drain plug is then removed by application of the ⅜" driver on the opposite end of the wrench extension. The waste fluid then empties into the funnel, which directs it into the waste container.

An advantage of the present invention is that it protects the user's hands from contamination by waste fluids.

A further advantage of the present invention is that it is simple and economical to manufacture.

A still further advantage of the present invention is that it securely directs waste fluid into a disposal container, avoiding spillage.

A further advantage of the present invention is that it allows an operator to use conventional sockets and drivers to remove a drain plug in an efficient, rapid manner without risking contamination of the operator's hands.

IN THE DRAWING

Figure 5:
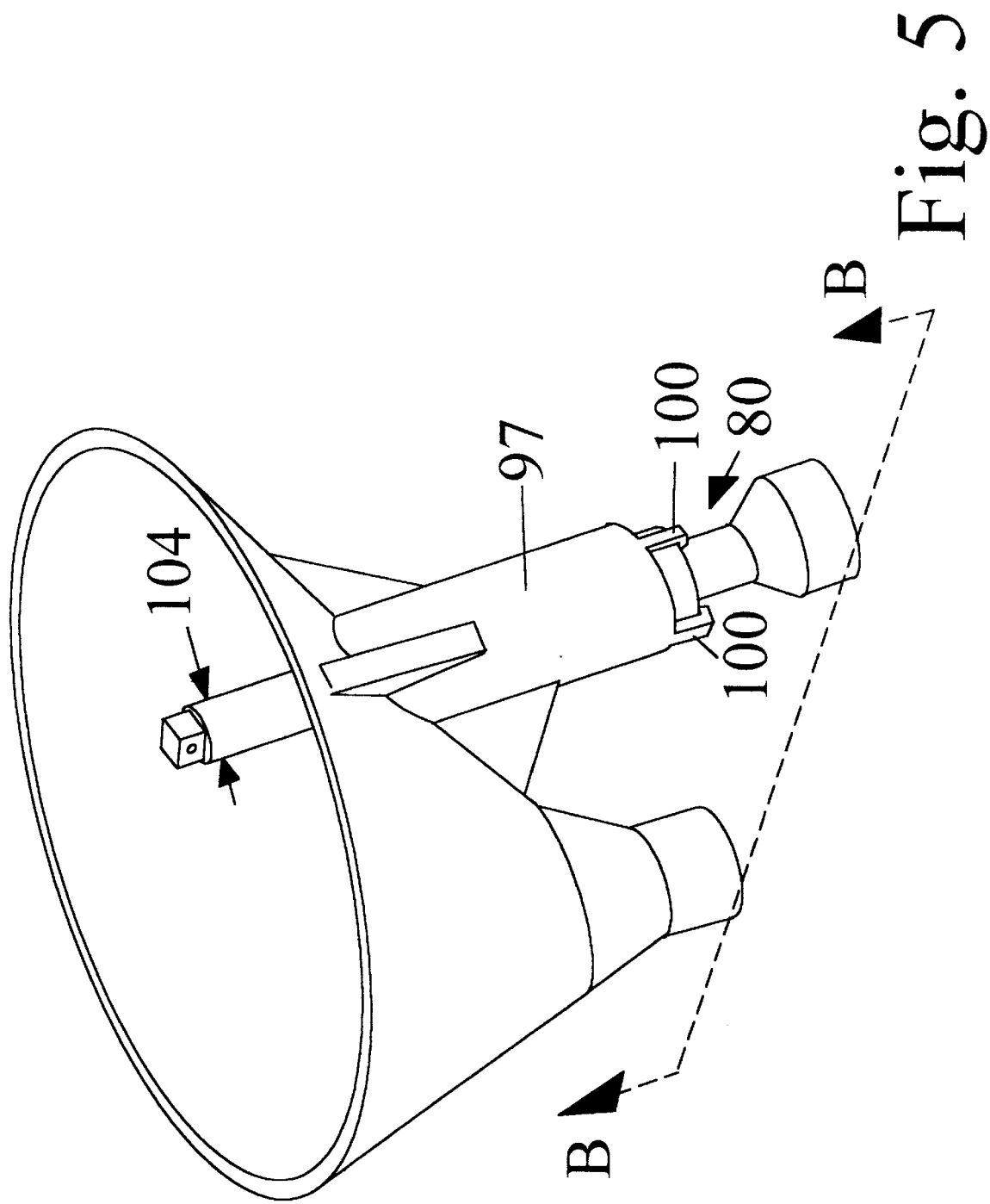
FIG. 5 shows flexible clips formed on a feed-through housing for captivating a wrench extension.
Figure 6A:
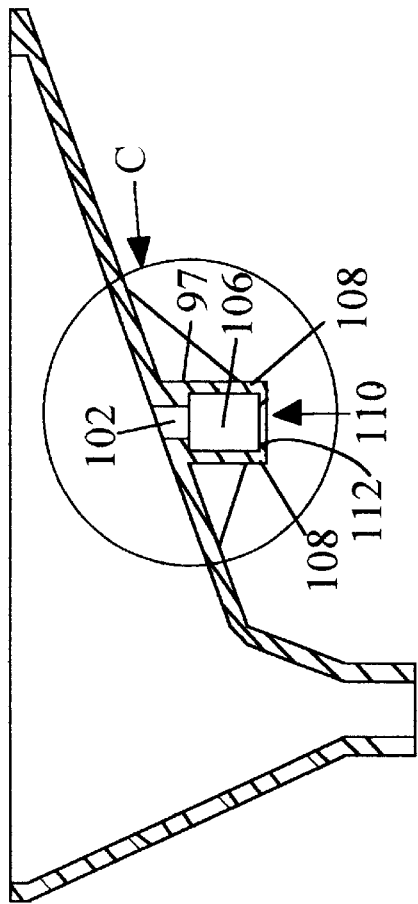
Figure 6B:
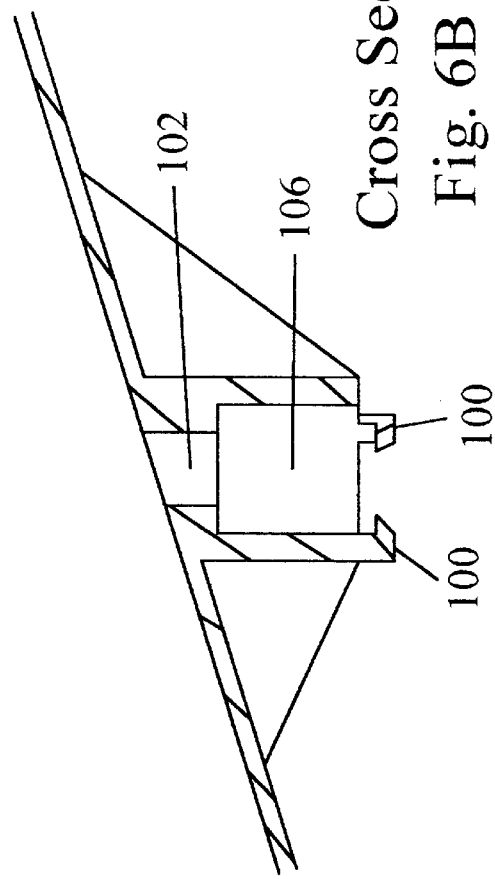
Figure 7:
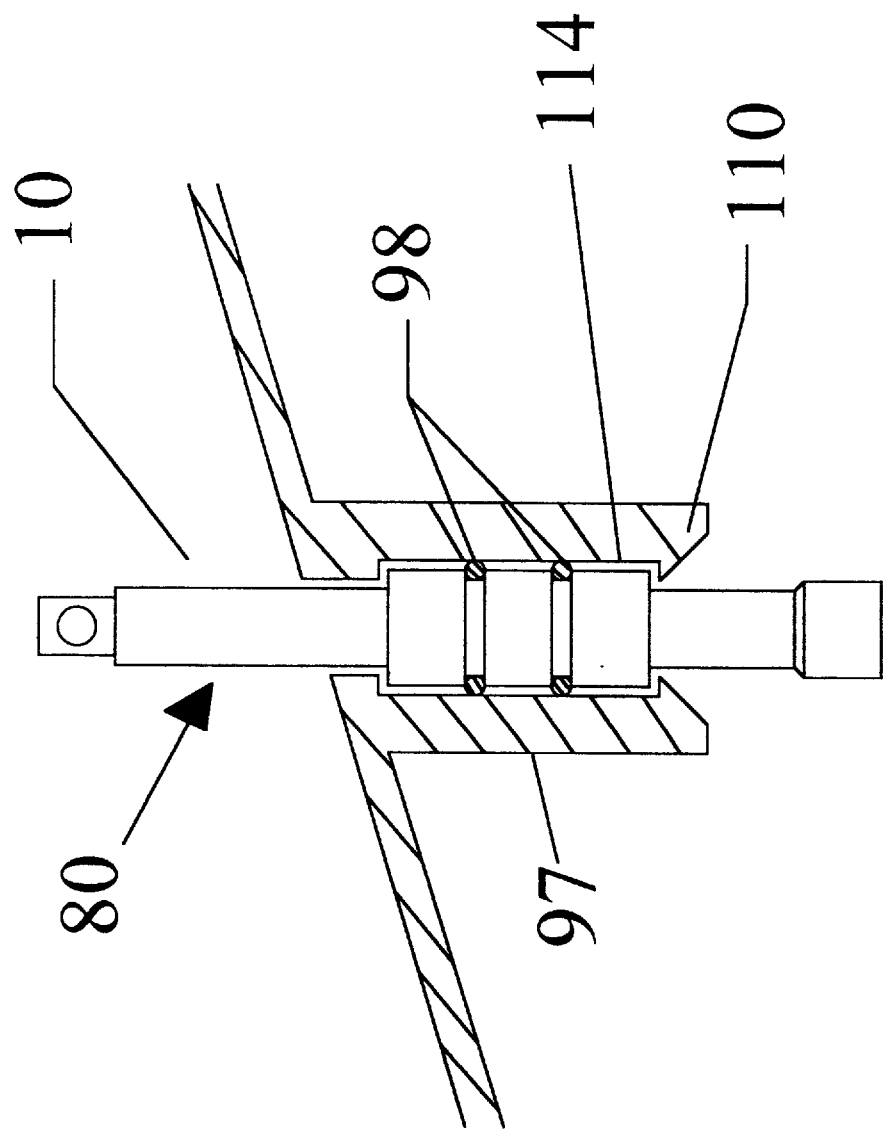
Figure 8:
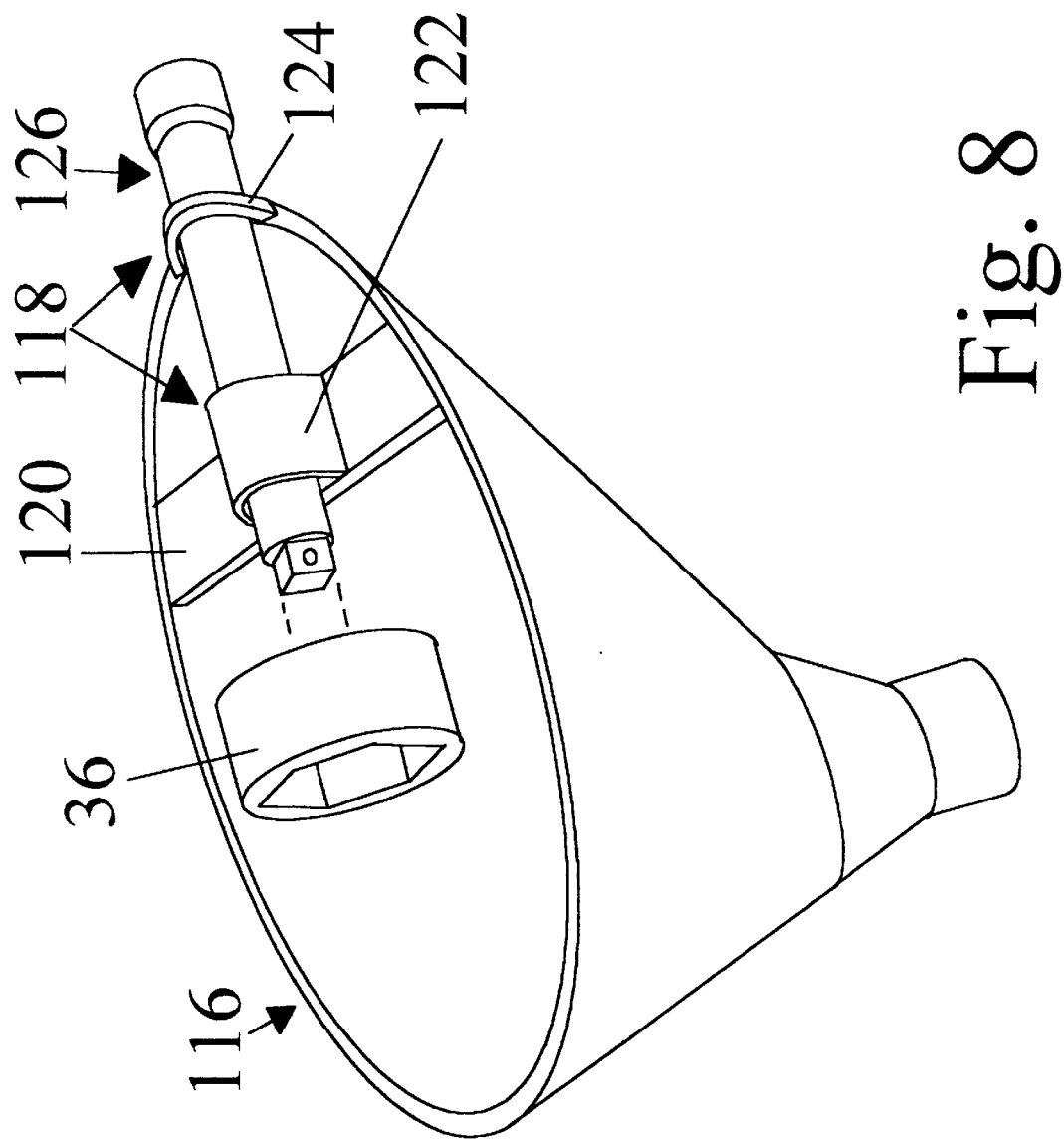
Figure 9:
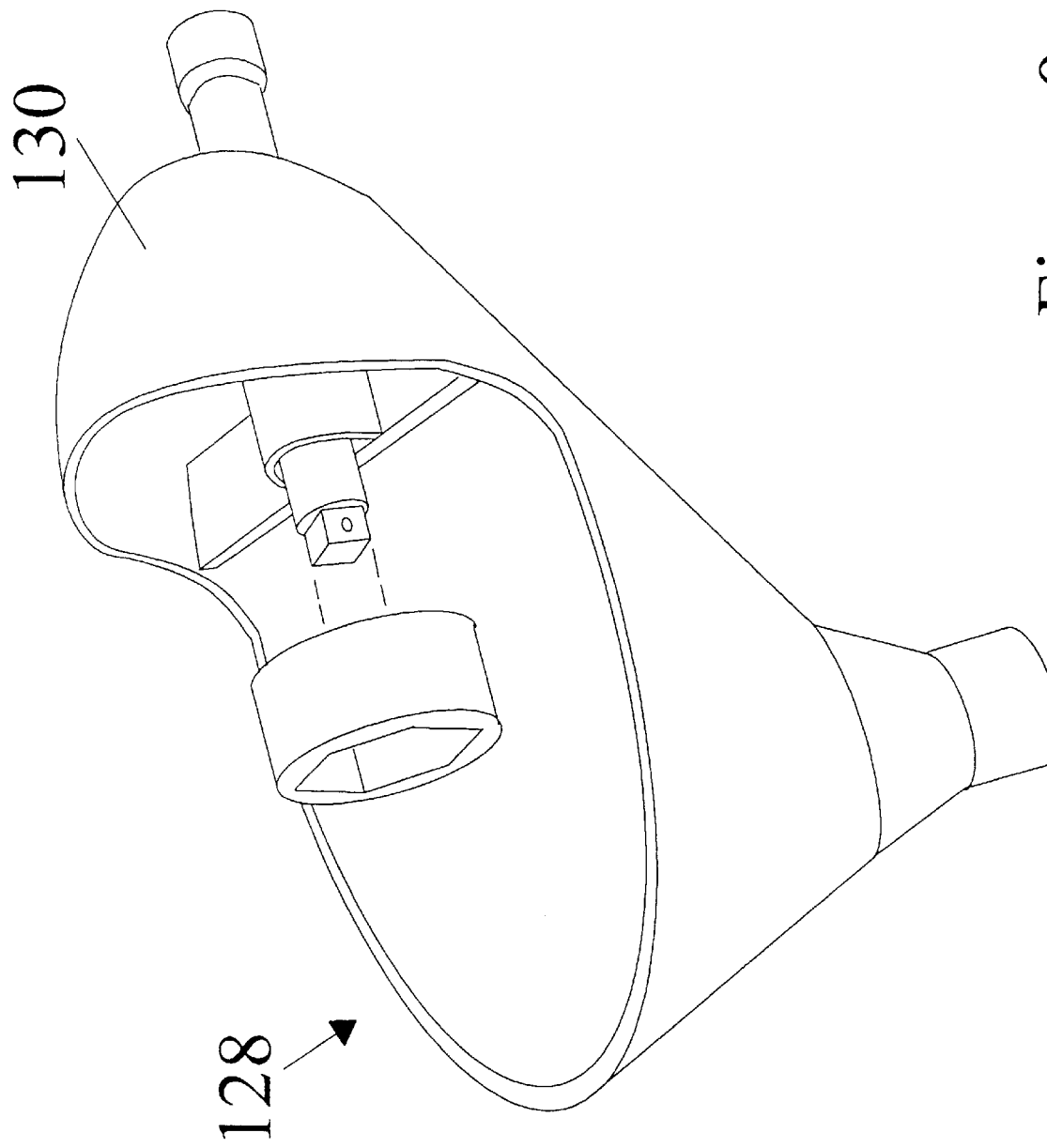
Figure 10:
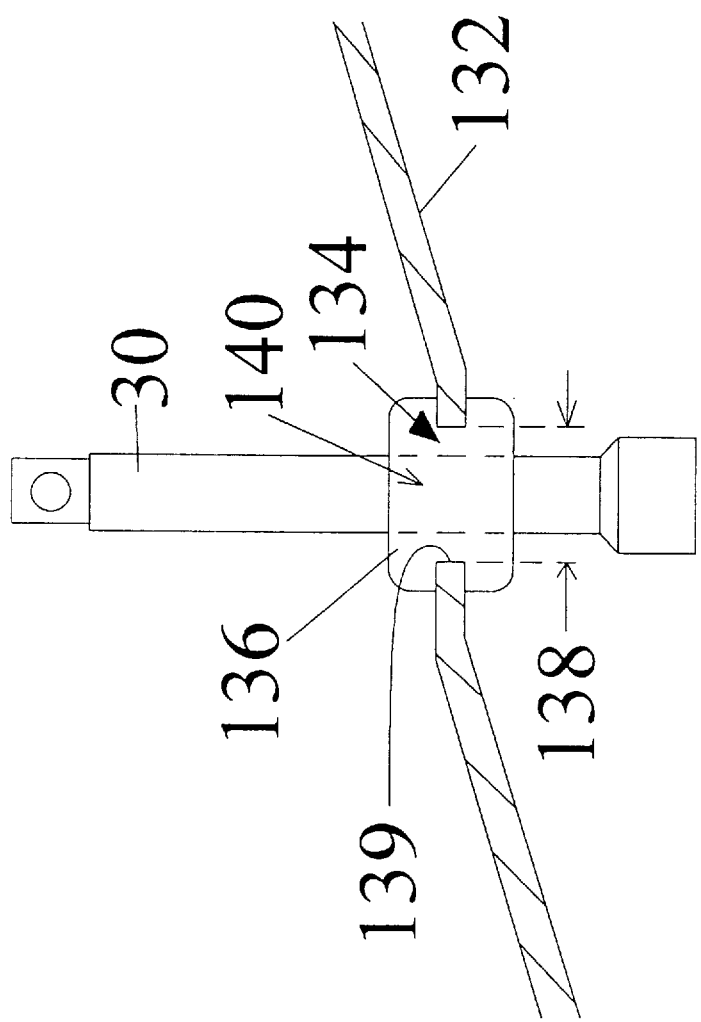
Figure 11:
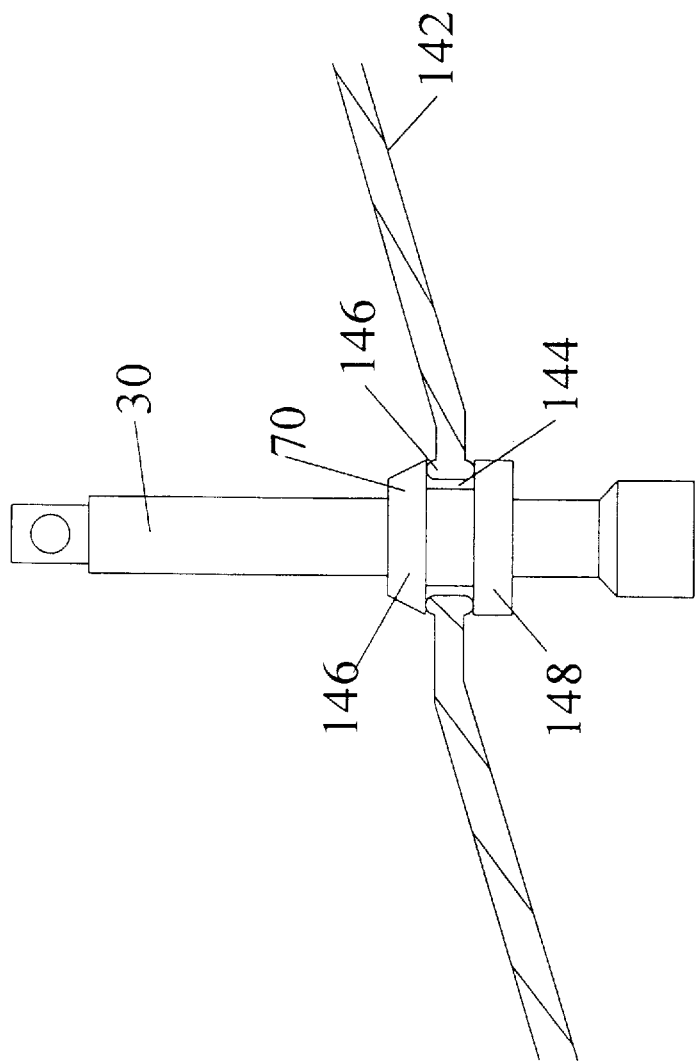
Figure 12:
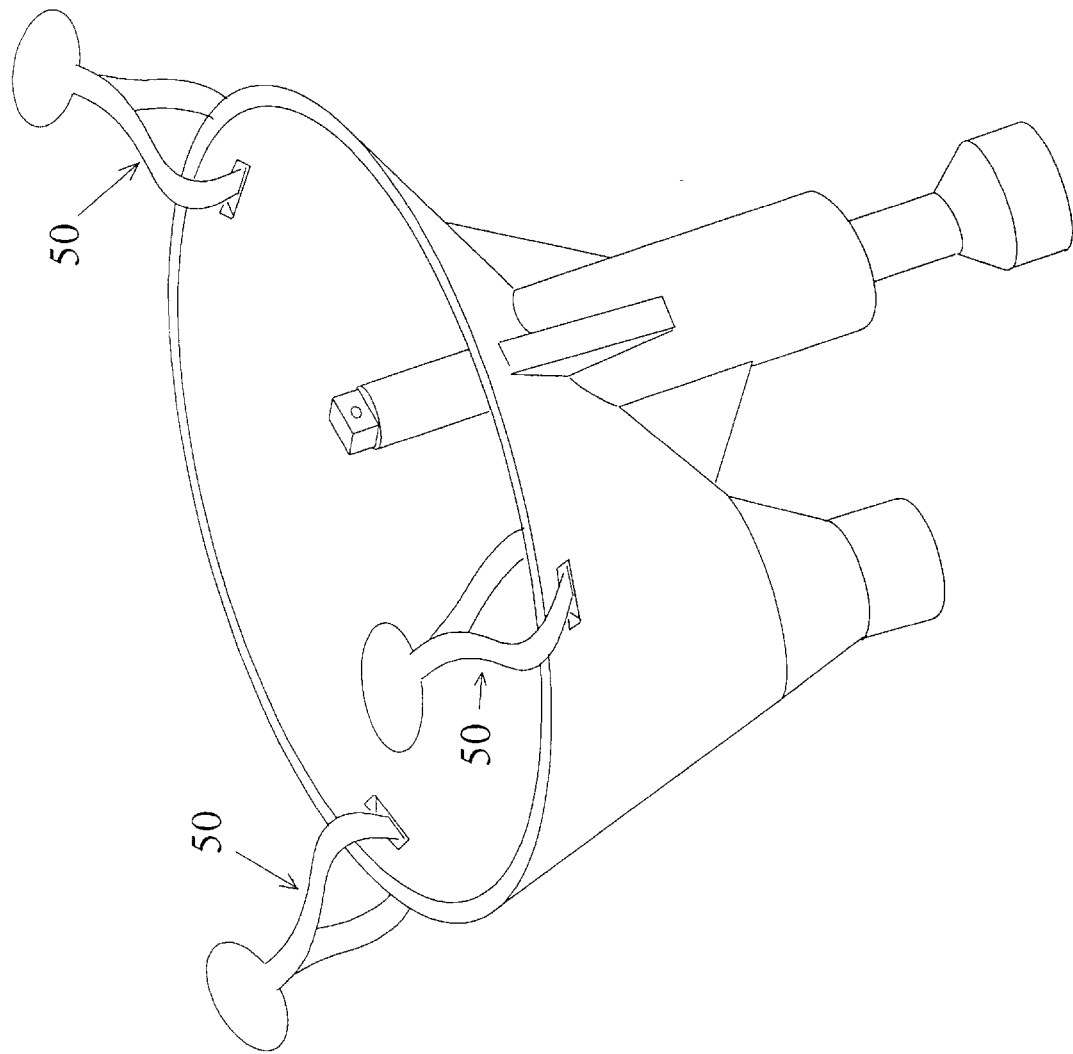
Figure 14:
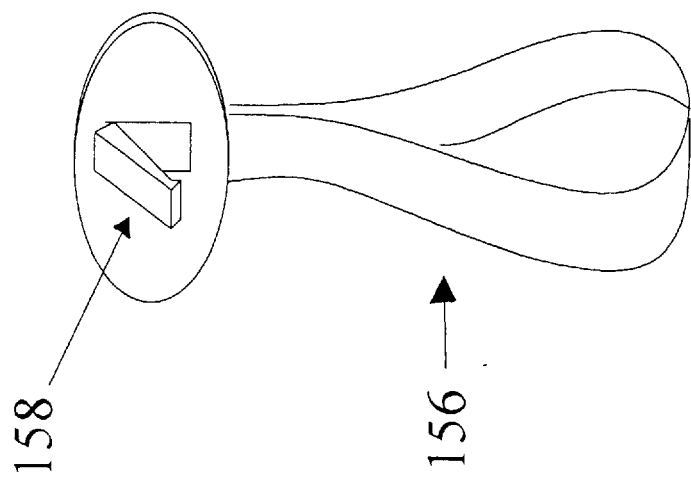
Figure 13:
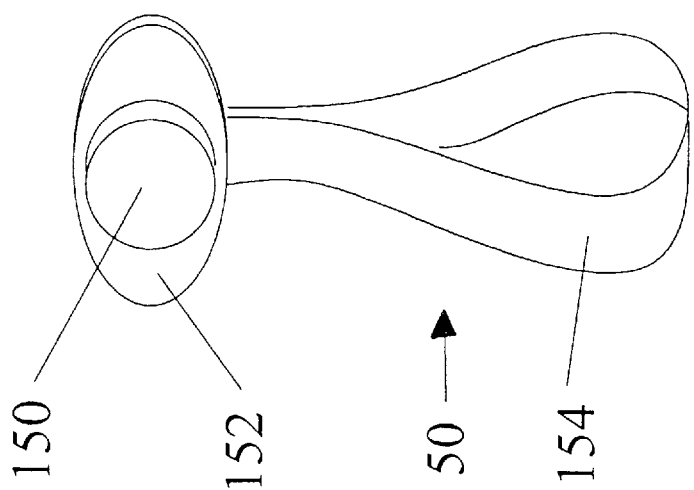

FIGS. 6A and 6B clarify the construction of the housing of FIG. 5;

FIG. 7 shows a cross-sectional view of the housing of FIG. 6A with an O-ring sealed wrench extension captivatingly installed;

FIG. 8 shows a tool for removal of waste fluid when the drain plug is horizontally mounted;

FIG. 9 shows a tool similar to the tool of FIG. 8 except with a splash guard;

FIG. 10 illustrates the use of a grommet for sealing an opening through a funnel wall with a wrench extension installed;

FIG. 11 illustrates use of a friction ring and stabilizing ring to seal an opening in a funnel wall with a wrench extension installed;

FIG. 12 shows straps attached to a funnel for suspending the funnel from a reservoir;

FIG. 13 shows a strap with a magnet for attachment to a magnetic reservoir;

FIG. 14 shows use of a clip for attachment to a reservoir; and

Figure 15:
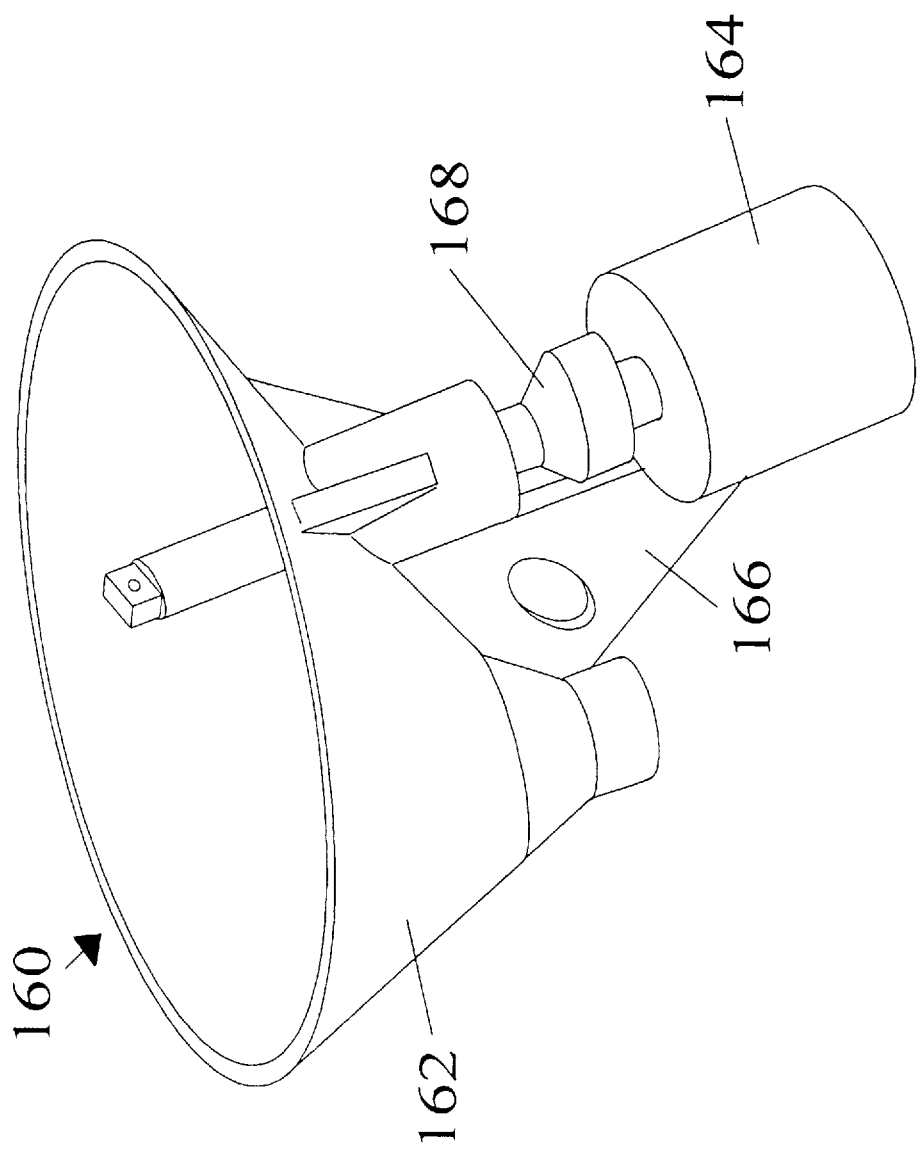

FIG. 15 illustrates use of a motor for driving a wrench extension.

DESCRIPTION OF THE PREFERRED EMBODIMENT

Figure 1:
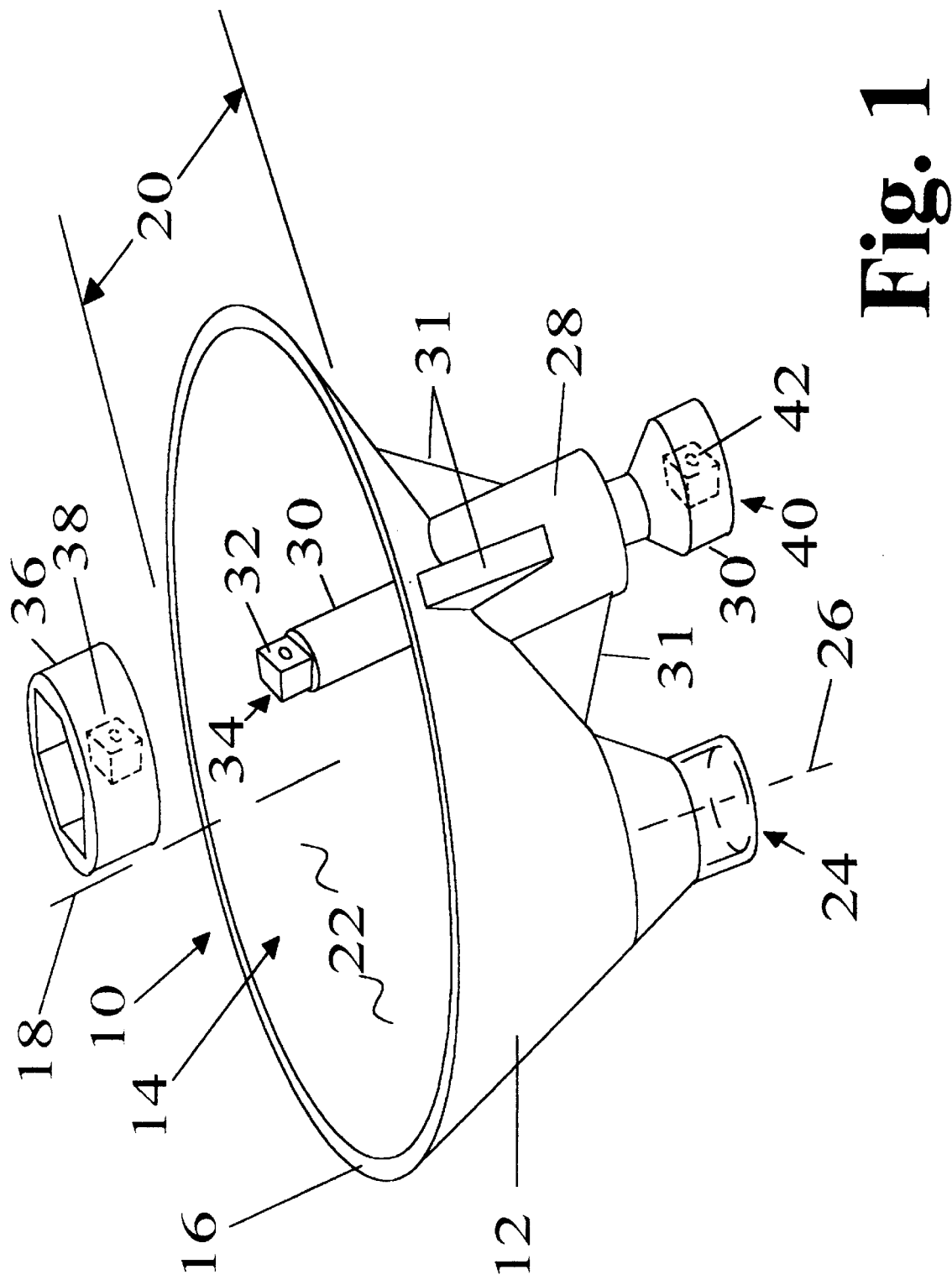
FIG. 1 shows a preferred embodiment of the tool for removing waste fluid.

Referring now to FIG. 1 of the drawing, a preferred embodiment of the tool 10 for removing waste fluids is shown according to the present invention. The tool has a funnel portion 12 having a large opening 14 defined by edge 16. The opening 14 as shown is circular with a central axis 18 and a diameter 20. A circumferential funnel wall 22 extends from the edge 16, the funnel narrowing as the wall 22 extends away from the edge 16, terminating in a smaller fluid exit opening 24. The central axis 26 of the smaller fluid exit opening 24 is displaced from the axis 18 of the larger opening 14 for convenience in allowing space on the wall 22 for attachment or formation of a wrench extension feed through housing 28, serving as a guide for passage of a wrench extension 30. Supports 31 provide added structural integrity to the housing 28. The extension 30 preferably has a plug 32 on a first end 34 extending towards the large opening 14 for engagement with a standard receptacle 38 of a socket or plug 36 as appropriate for engagement with a particular drain plug. The preferred size drive is a ⅜" square standard drive. The opposite, second end 40 of the extension 30 is preferably configured having a standard square ⅜" socket 42 for mating with standard ⅜" wrench drivers, such as a ⅜" ratchet driver for rapid removal of a drain plug. Although ⅜" drivers and sockets are preferred as being in most common use, other types of sockets and plugs are also included in the spirit of the present invention. The configuration of the funnel 12 is also given by way of example, and other equivalent configurations are to be included in the spirit of the present invention. For example, the edge 16, wall 22 and exit 24 need not be circular, but could be any functional shape, the basic idea being to provide funnel tapering from a large opening 14 to a small opening 24. A fluid tight feed through/access in a wall is provided to allow a wrench extension 30 to be fed through for removal of a drain plug. The wrench extension 30 can be of either standard or special manufacture for use with the funnel 12, and can be either captivated or uncaptivated in the housing 28. This will be fully explained in the following text as referred to in the various figures of the drawing.

Figure 2:
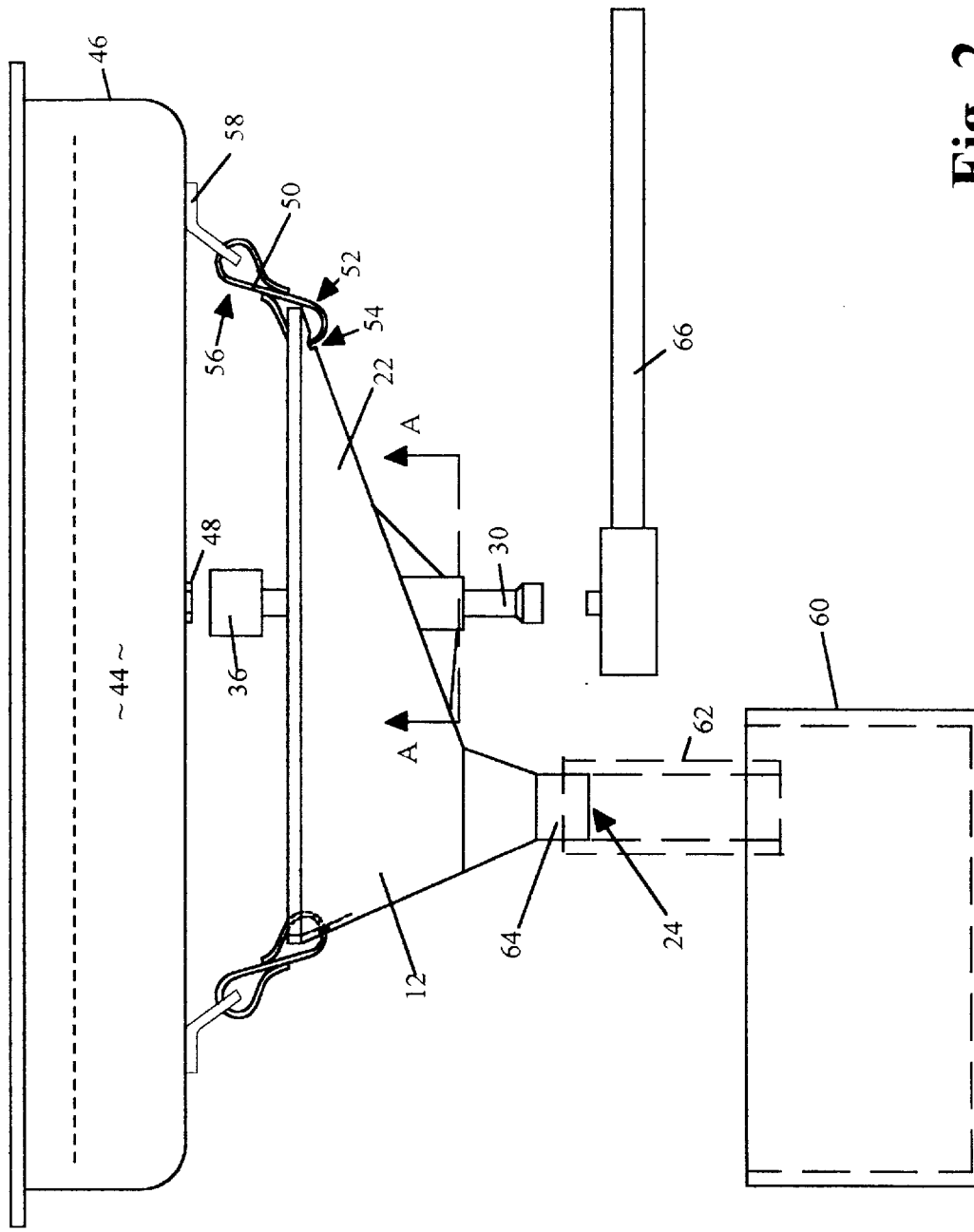
FIG. 2 illustrates the use of the tool in transferring waste fluid from a reservoir to a waste container.

FIG. 2 shows how the tool of the present invention is applied to remove waste fluid 44 from a reservoir 46 having a drain plug 48. The funnel 12 can either be held by hand or supported in any manner. For example, as shown in FIG. 2, straps 50 or other type of ties, etc. can be attached to the funnel 12 and to the reservoir 46 to support the funnel. In the preferred embodiment, one end 52 of straps 50 is secured through slots 54 in the walls 22 of the funnel. The opposite end 56 of the strap 50 is attached to a magnet 58 for securing to a typical reservoir 46 constructed of magnetic material such as steel, etc. A collection container 60 is placed beneath the exit 24. Alternatively, a hose 62 can be attached to end 64 of the funnel 12 to help guide the fluid 44 to the container 60. An operator places the appropriate socket or plug 36 on the extension 30, and engages and removes the plug 48 with the assistance of a driver 66.

Figure 3:
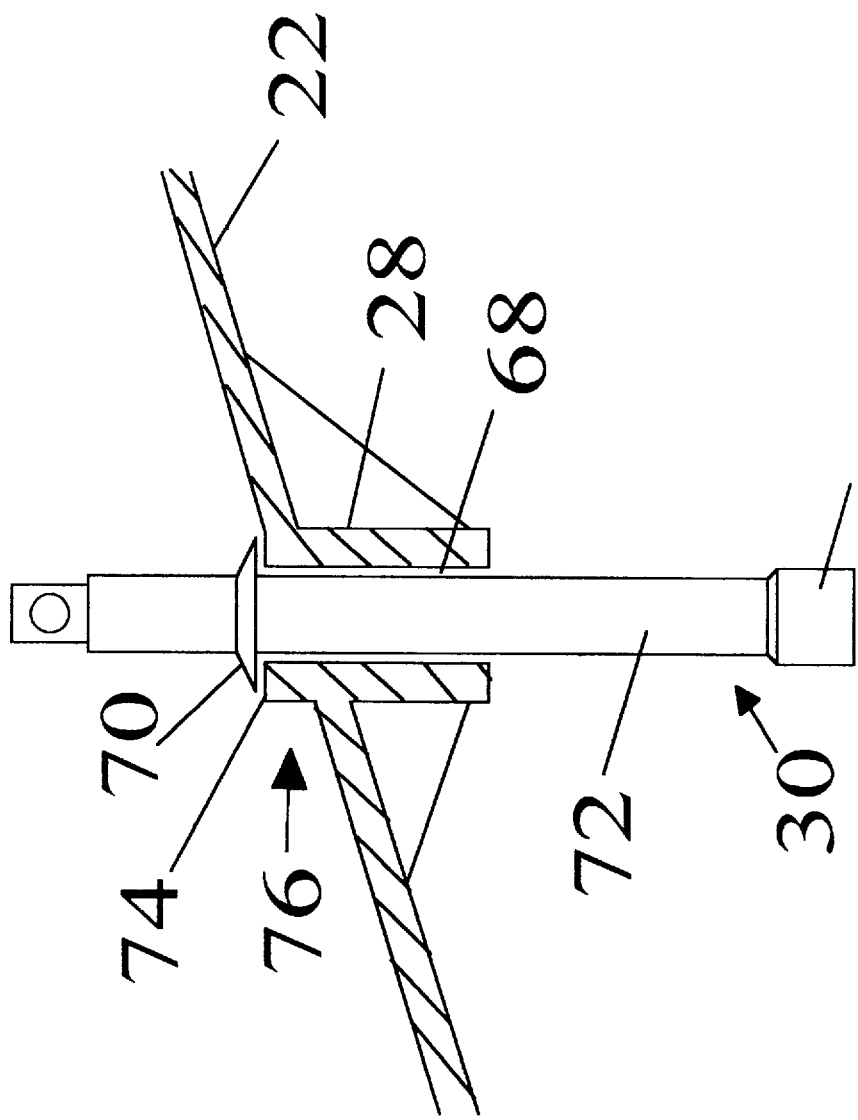
FIG. 3 shows a wrench extension feed-through housing sealed with a friction ring.

Referring to FIG. 3, the cross section "A" indicated in FIG. 2 is shown to clarify the housing 28 attached to the wall 22 of the funnel 12. The housing 28 has a bore 68 therethrough. A friction ring 70, constructed from a resilient material is dimensioned for an interference fit over the diameter of the shaft 72 of the wrench extension 30. The function of the friction ring 70 is to keep fluid from exiting through the bore 68, and to keep the extension 30 from falling out during the fluid drain process. Other methods of sealing the housing 28 from passing fluid will be apparent to those skilled in the art and are included in the spirit of the present invention. The novel friction ring 70 has the advantage of simplicity. The tight fit over the extension 30 keeps the extension 30 from falling out and at the same time, with the extension in its free state, gravity holds the friction ring 70 against the flat sealing surface 74 of the inside end 76 of the housing 28, thereby blocking waste fluid from entering the bore 68.

An alternate embodiment of the present invention includes an extension 30 whereon the ring 70 is an integral part of the extension. In this case, the extension 30 is a non-standard part supplied with the funnel 12. The wrench handle socket end/second end 40 (FIG. 1) in such a case could be either of reduced diameter for clearance through bore 68, or it can be a separate part 78 attached to the shaft 72, either permanently attached or removable in any number of ways well known to those skilled in the art. Alternative structures will no doubt be apparent to those skilled in the art from reading the specification, and these are included in the spirit of the present invention.

Figure 4:
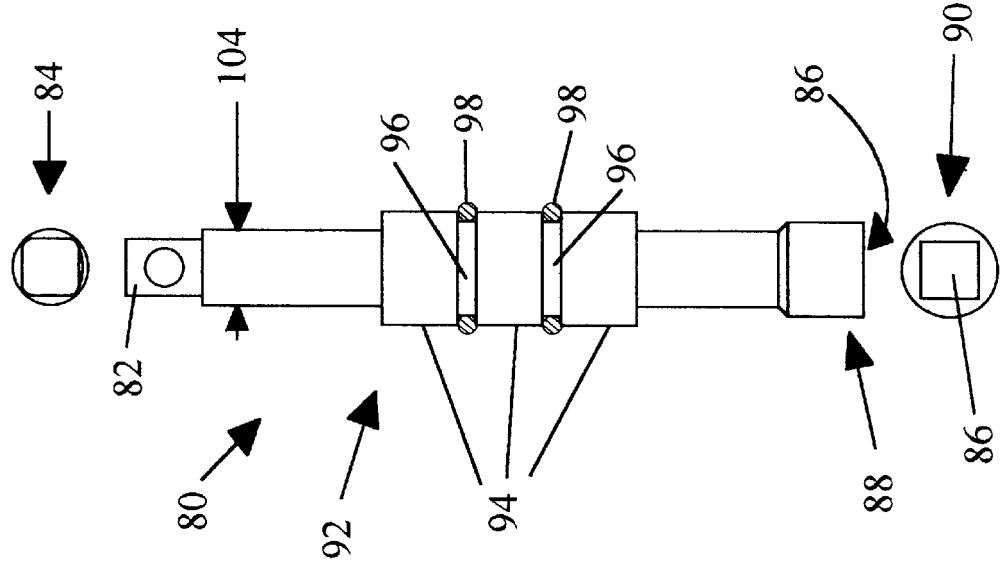
FIG. 4 shows a wrench extension with O-ring seals attached.

An alternate embodiment of a wrench extension 80 using O-ring seals is shown in FIG. 4. A square socket plug 82 is clarified in end view 84, and the wrench driver socket 86 at the other (second) end 88 is clarified in end view 90. The shaft 92 is shown to have three enlarged areas 94 in which grooves 96 are formed for placement of O-rings 98, shown in cross section to allow view of the grooves 96. The areas 94, grooves 96, and O-rings 98 are dimensioned for sealing the wrench extension with the bore 68 of the housing 97 (FIG. 5).

FIG. 5 shows flexible clips 100 formed on the housing 97 to capture the enlargened area 94 (FIG. 4) so as to prevent the extension 80 from falling out of the housing 97.

FIGS. 6A and 6B clarify the construction of housing 97, and give alternate ways of retaining the extension 80. FIG. 6A is a cross sectional view "B" (indicated in FIG. 5) showing the internal construction of the housing 97. As viewed in FIG. 6A, a smaller bore 102 is for passage of the smaller diameter 104 (FIGS. 4 and 5) of the extension, and larger bore 106 is for the enlargened areas 94 of the extension (FIG. 4). The portions 108 in FIG. 6A illustrate a one way insertion ring 110, allowing installation of the extension 80. The taper 112 provides one way insertion, and keeps the extension from falling out. Alternatively, the portion 108 in FIG. 6A is illustrative of one way insertion clips 100, also shown in FIG. 5. FIG. 6B is a cross sectional area similar to area "C" of FIG. 6A, except with clips 100 instead of an insertion ring.

FIG. 7 shows a cross sectional view of area "C" wherein the extension 80 is installed in the housing 97. The O-rings 98 prevent fluid from escaping through the bore 114 of the housing 97, while allowing the extension 80 to rotate. Again, one way insertion clips 100 could also be used instead of the insertion ring 110 shown.

FIG. 8 shows a tool 116 for removal of waste fluid when the drain plug is horizontally mounted. A bracket 118 is shown, formed from a cross bar 120 and two loops 122 and 124 for guiding a standard wrench extension 126 to engage with a socket or plug 36 for removing the drain plug.

FIG. 9 shows a tool 128, similar to FIG. 8, except for an added splash guard 130, providing additional security against spillage of waste fluid and contamination of an operator's hands. As shown in FIG. 9, the splash guard 130 is integrally formed and extends from the wall of the funnel.

FIG. 10 shows an alternate, less costly structure for inserting a wrench extension 30 through a funnel wall 132. The funnel is otherwise similar to that shown in FIG. 1 and therefore is not shown in FIG. 10. The wall 132 has an opening 134, normally circular, for insertion of a grommet 136. The grommet 136 and diameter 138 of the edge 139 of the hole 134 are designed for a fluid tight seal. Similarly, the hole 140 through the grommet allows passage of the extension, and is designed for a fluid tight seal.

FIG. 11 shows a funnel wall 142 with a hole 144 formed therethrough. The edge 146 of the hole 144 is embossed to provide a bearing surface to a friction seal 70. This seal 70 is of the same type as described in relation to FIG. 1. The difference is that the embodiment of FIG. 11 does not have a housing 28, and the bearing surface for the seal 70 is the embossed edge 146. Item 148 is a stabilizing ring, working in cooperation with the flexible friction ring 70 to resist tilting of the extension 30.

FIG. 12 is a perspective view, more clearly showing the attachment of the straps 50 of FIG. 2 attached to the funnel wall 12.

FIG. 13 shows the strap 50 with a magnet 150 attached to a tab 152, attached to a looped strap 154 for attachment to the funnel wall 12.

FIG. 14 shows an alternate strap 156 wherein a clip 158 is used to attach to any available item on a waste container for supporting the tool. As described above, other methods of attachment will be apparent to those skilled in the art from reading this disclosure, and these are included in the spirit of the present invention.

FIG. 15 shows a tool 160 having a funnel 162 similar to funnel 12 of FIG. 1, except that tool 160 has a motor 164 attached to funnel 162 by bracket 166 for driving a wrench extension 168. The fluid seal in this case is preferably the O-ring method of FIG. 7, except the retainer/friction ring, etc. is optional since the motor keeps the extension from falling out.

Although a preferred embodiment of the present invention has been described above, it will be appreciated that certain alterations and modifications thereof will become apparent to those skilled in the art. It is therefore intended that the appended claims be interpreted as covering all such alterations and modifications as fall within the true spirit and scope of the invention.

What is claimed is:

1. A tool for use in draining waste fluid from a reservoir having a drain plug comprising:

a) a funnel having a larger opening and a wall tapering from said larger opening to a smaller opening;

b) wrench extension means; and c) access means providing seal means for sealed passage of said wrench extension means through said wall, and for alignment of an axis of said wrench extension means to be oriented perpendicular to a plane defined by said larger opening, wherein said access means includes housing means attached to said wall, said housing means having a bore therethrough.

2. A tool as recited in claim 1 further comprising:

strap means for securing said funnel means to said reservoir.

3. A tool as recited in claim 1 wherein said seal means is 0-ring means in said bore.

4. A tool as recited in claim 1 wherein said seal means is a friction ring attached to said wrench extension means for sealing against one end of said housing means.

5. A tool as recited in claim 1 further comprising:

means for captivating said wrench extension means in said housing means.

6. A tool for use in draining waste fluid from a reservoir having a drain plug comprising:

a) a funnel having a larger opening defined at least in part by a portion to be positioned in a generally horizontal plane when said tool is in use, and said funnel means having a wall tapering from said larger opening to a smaller opening;

b) a wrench extension means having a socket on one end, a stud on the other end and a longitudinal axis extending between the socket and the stud; and c) mounting means for rotatably mounting said wrench extension means in a position with said axis of said extension means lying substantially in a plane parallel to a plane defined by said portion of said larger opening for removing a horizontally oriented drain plug.

7. A tool as recited in claim 6 further comprising splash guard means for protecting an operator from said waste fluid.

8. A tool as recited in claim 7 wherein said splash guard has an opening for passage of said extension means, and is integrally formed with and extends from said wall.

\* \* \* \* \*